(12) United States Patent　(10) Patent No.: US 7,484,924 B2
Soupizon　(45) Date of Patent: Feb. 3, 2009

(54) DEVICE FOR LIMITING TURBINE OVERSPEED IN A TURBOMACHINE

(75) Inventor: Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 495 days.

(21) Appl. No.: 11/227,137

(22) Filed: Sep. 16, 2005

(65) Prior Publication Data

US 2006/0251506 A1　Nov. 9, 2006

(30) Foreign Application Priority Data

Sep. 28, 2004　(FR)　................................. 04 10229

(51) Int. Cl.
*F01D 21/00*　(2006.01)
*F01B 25/00*　(2006.01)
(52) U.S. Cl. ........................ 415/9; 60/39.091
(58) Field of Classification Search ............... 415/9, 415/174.1; 416/244 R; 60/39.091
See application file for complete search history.

(56) References Cited

U.S. PATENT DOCUMENTS

| 2,966,333 | A | | 12/1960 | Flanagan |
| 3,490,748 | A | * | 1/1970 | Hoffman ........................ 415/9 |
| 3,989,407 | A | | 11/1976 | Cunningham et al. |
| 4,498,291 | A | | 2/1985 | Jeffery et al. |
| 4,503,667 | A | * | 3/1985 | Roberts ................... 60/39.091 |
| 4,505,104 | A | * | 3/1985 | Simmons ................. 60/39.091 |

FOREIGN PATENT DOCUMENTS

GB　2 128 686　5/1984

* cited by examiner

*Primary Examiner*—Edward Look
*Assistant Examiner*—Dwayne J White
(74) *Attorney, Agent, or Firm*—Oblon, Spivak, McClelland, Maier & Neustadt, P.C.

(57) ABSTRACT

Device for limiting turbine overspeed in a turbomachine, the turbine comprising a rotor formed of disks mounted on a turbine shaft and carrying moving blades, stages of fixed blades disposed between the disks of the rotor, and means for shearing the moving blades of the upstream disk of the rotor, these means being carried by a circumferential rim of a stage of fixed blades of the turbine.

20 Claims, 4 Drawing Sheets

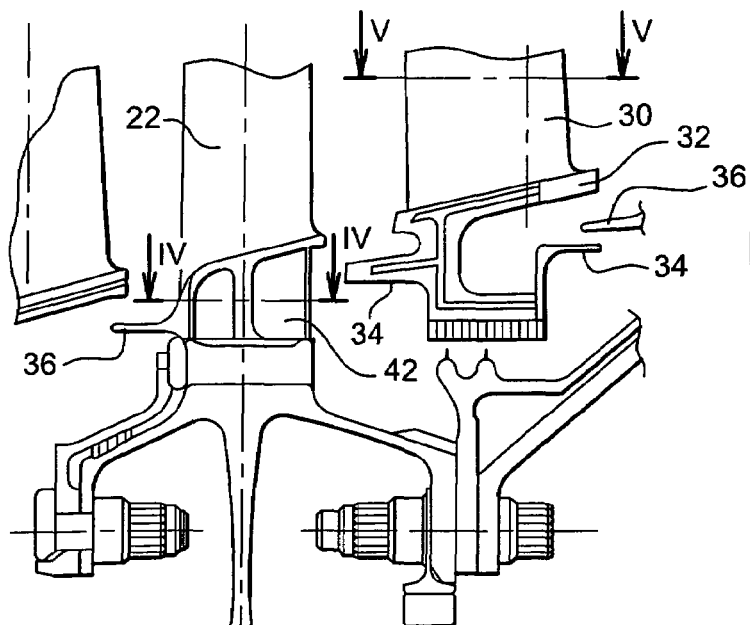
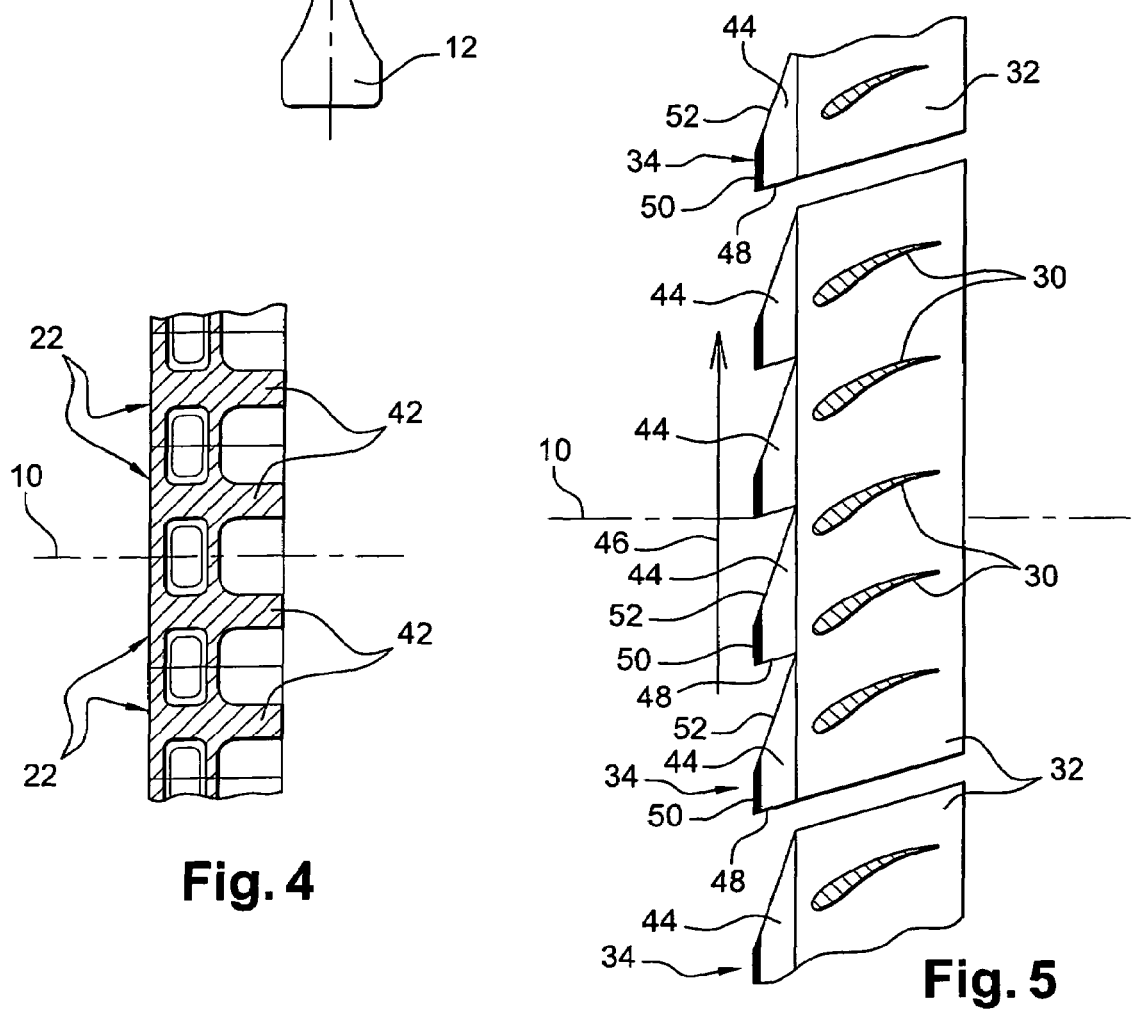

DEVICE FOR LIMITING TURBINE OVERSPEED IN A TURBOMACHINE

The present invention relates to a device for limiting turbine overspeed in a turbomachine, such as a turbojet, in the case of a fracture of the turbine shaft.

BACKGROUND OF THE INVENTION

A fracture of the turbine shaft of a turbomachine, fortunately very infrequent in practice, can be due to poor fitting or poor protection of the shaft from oxidation.

At the time of fracture of this shaft, which connects the rotor of the turbine to the fan of the turbomachine, the moving blades of the turbine are still driven in rotation by the gases emerging from the combustion chamber of the turbomachine but are detached from the fan which was limiting their speed of rotation. The turbine then races and goes into "overspeed", which subjects the moving blades to excessive stresses able to cause an explosion of the rotor with risks of perforating the outer casing of the turbine and of perforation of the fuselage of the aircraft fitted with this turbomachine. Limiting overspeed is therefore a major constraint to be complied with in turbomachines.

The known devices for limiting overspeed generally use the downstream displacement of the rotor of the turbine which results from the fracture of the turbine shaft and the pressure of the gases on the blades of the rotor.

Devices have already been proposed for the mechanical braking of the turbine rotor, comprising means carried by the rotor and intended to come to bear on corresponding means of the stator in such a way as to brake the rotor, following its downstream displacement after the fracture of the turbine shaft.

These devices have the disadvantage of being relatively slow, which acts against their efficiency.

It has also been proposed to fit guide blades of the stator in a detachable or pivoting manner so that the rotor, during its downstream displacement after the fracture of the turbine shaft, comes to bear on these blades and causes them to pivot over the path of the moving blades in order to destroy them and thus to slow down the rotation of the turbine. This known solution is however complex and costly. It is also necessary to provide means preventing the pivoting of these guide blades for causes other than the fracture of the turbine shaft.

Furthermore, the known devices generally have the disadvantage of increasing the overall mass of the turbine and of modifying the aerodynamic profile of its components.

SUMMARY OF THE INVENTION

A particular purpose of the invention is to provide a simple, economic and effective solution to these problems and to avoid the disadvantages of the prior art.

Another purpose of the invention is to meet, in a more satisfactory manner, the requirements of reliability and quickness of a device for limiting overspeed of a turbine in a turbomachine.

For this purpose it proposes a device for limiting overspeed of a turbine in a turbomachine, the turbine comprising a rotor formed from disks mounted on a turbine shaft and carrying moving blades, stages of fixed blades disposed between the disks of the rotor, and means of destruction of the blades of the disks of the rotor in the case of fracture of the turbine shaft, wherein these means of destruction are fixed and carried by a stage of fixed blades situated between the upstream disk of the rotor and the following disk of that rotor and are intended to shear the blades of the upstream disk of the rotor at the start of a downstream displacement of the rotor resulting from the fracture of the turbine shaft.

The destroyed blades are projected onto the other blades of the rotor and onto those of the stator of the turbine and cause their destruction, which prevents the rotor from going into overspeed, the destroyed blades no longer providing it with mechanical energy.

The device according to the invention formed by a stage of fixed blades of the turbine does not modify the flow of gases in the turbine and does not reduce the performance of the turbomachine.

The shearing means of the device according to the invention are fixed, and therefore much easier to produce and to implement than in the prior art.

In a preferred embodiment of the invention, the shearing means are carried or formed by an upstream circumferential rim of the stage of fixed blades and are intended to act on thin parts or "struts" of the moving blades, adjacent to the blade roots.

The strut of a moving blade is generally the most fragile part of the blade. The device according to the invention therefore takes advantage of the relative fragility of this part of the blade in order to destroy it as quickly as possible in the case of a fracture of the turbine shaft.

The shearing means preferably have an axial dimension protruding in the upstream direction equal to at least a fraction of the axial dimension of the thin parts of the moving blades to be sheared.

This axial dimension of the shearing means must be sufficient for the uncut or non-destroyed part of the moving blades to be subjected to a stress at least equal to its ultimate breaking strength.

In a preferred embodiment of the invention, the shearing means comprise a plurality of sawteeth elements distributed around the circumference of said rim of the stage of fixed blades.

The shearing means are advantageously formed in one piece with one or more annular sectors of the stage of fixed blades. They can be produced at the same time as the fixed blades, which significantly reduces the cost of the device according to the invention in comparison with that of the prior art.

The shearing means are advantageously made from a material of hardness greater than that of the moving blades to be destroyed. They can also be covered at least partially with an abrasive material, which makes it possible to wear the parts of the moving blades to be destroyed more quickly and more efficiently.

The device according to the invention is particularly but not exclusively intended for limiting overspeed of a low-pressure turbine in a turbojet.

BRIEF DESCRIPTION OF THE DRAWINGS

Other advantages and features of the invention will become apparent on reading the following description given by way of non-limiting example and with reference to the appended drawings in which:

FIG. 3 is an enlarged diagrammatic view of a part of FIG. 1 illustrating the device for limiting overspeed of the turbine according to the invention;

FIG. 4 is a cross-sectional view through the line IV-IV of FIG. 3;

FIG. 5 is a cross-sectional view through the line V-V of FIG. 3;

DESCRIPTION OF THE PREFERRED EMBODIMENT

Figure 1:
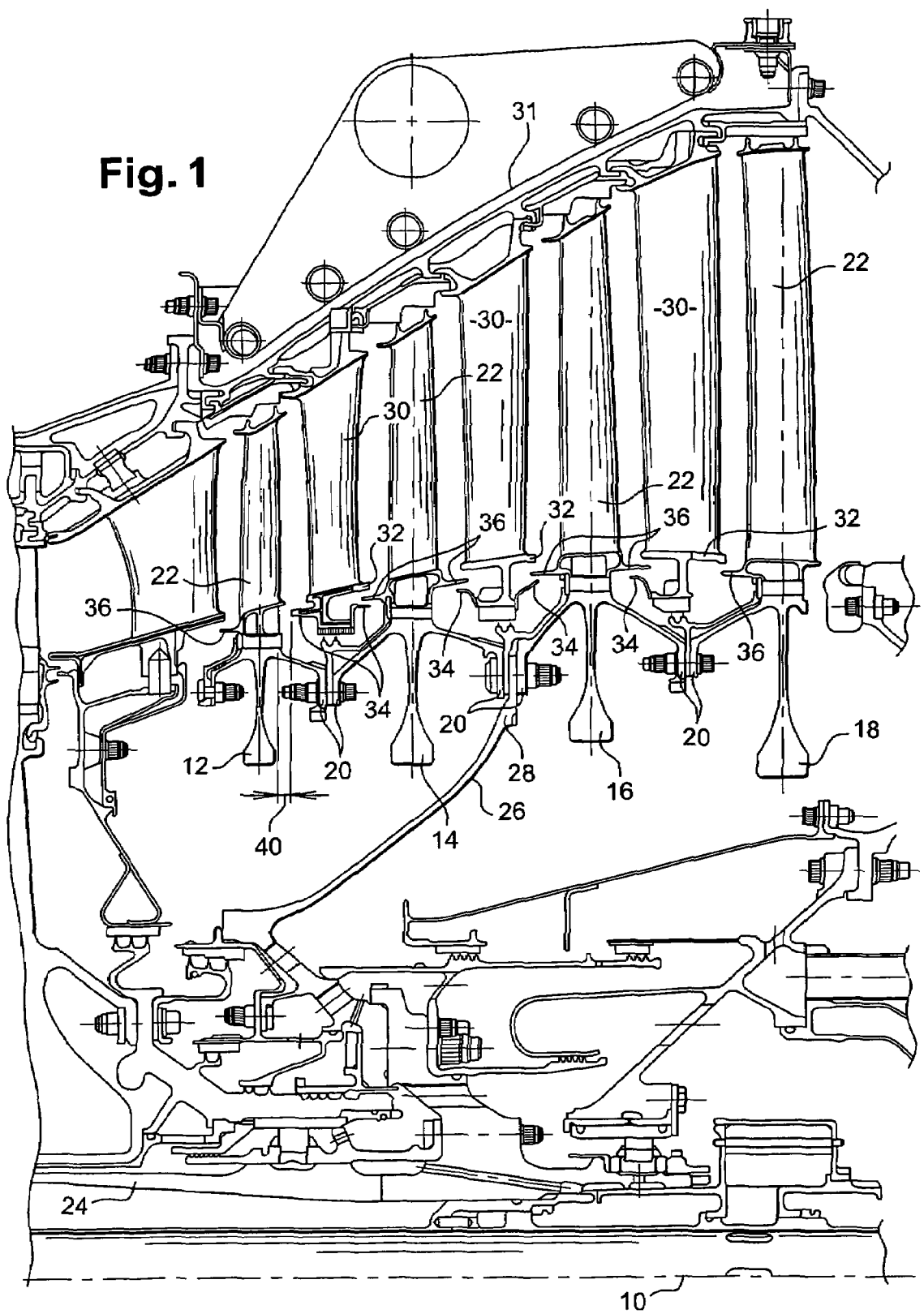
FIG. 1 is a partial diagrammatic view in axial cross-section of a low-pressure turbine of a turbojet equipped with the device according to the invention.

Reference will firstly be made to FIG. 1 which is a diagrammatic half-view of a low-pressure turbine of a turbojet, in a plane passing through the axis 10 of rotation of the rotor of the turbine.

The rotor of the low-pressure turbine comprises four disks 12, 14, 16, 18 assembled axially with respect to each other by annular flanges 20 and carrying individual blades 22 which are mounted by blade roots, for example by dovetailing or similar, at their radially inner end, on the outer periphery of the disks 12, 14, 16, 18. The rotor is connected to the turbine shaft 24 by the intermediary of a drive cone 26 fixed by means of an annular flange 28 between the annular flanges 20 of the disks 14 and 16 of the rotor of the low-pressure turbine.

Between the stages of moving blades 22 there are stages of fixed blades 30 which are mounted by appropriate means at their radially outer ends to a casing 31 of the low-pressure turbine. The fixed blades 30 are connected to each other at their radially inner ends by annular sectors 32 placed end to end on a circumference.

Upstream and downstream circumferential protrusions or rims 34 are formed axially protruding from the annular sectors 32. These rims 34 constitute chicanes with other circumferential protrusions or rims 36 upstream and downstream of the blades 22 of the rotor disks 12, 14, 16, 18, in order to limit the passage of combustion gases coming from the combustion chamber upstream of the turbine, radially from the outside towards the inside, and conversely of cold air radially from the inside towards the outside.

Figure 2:
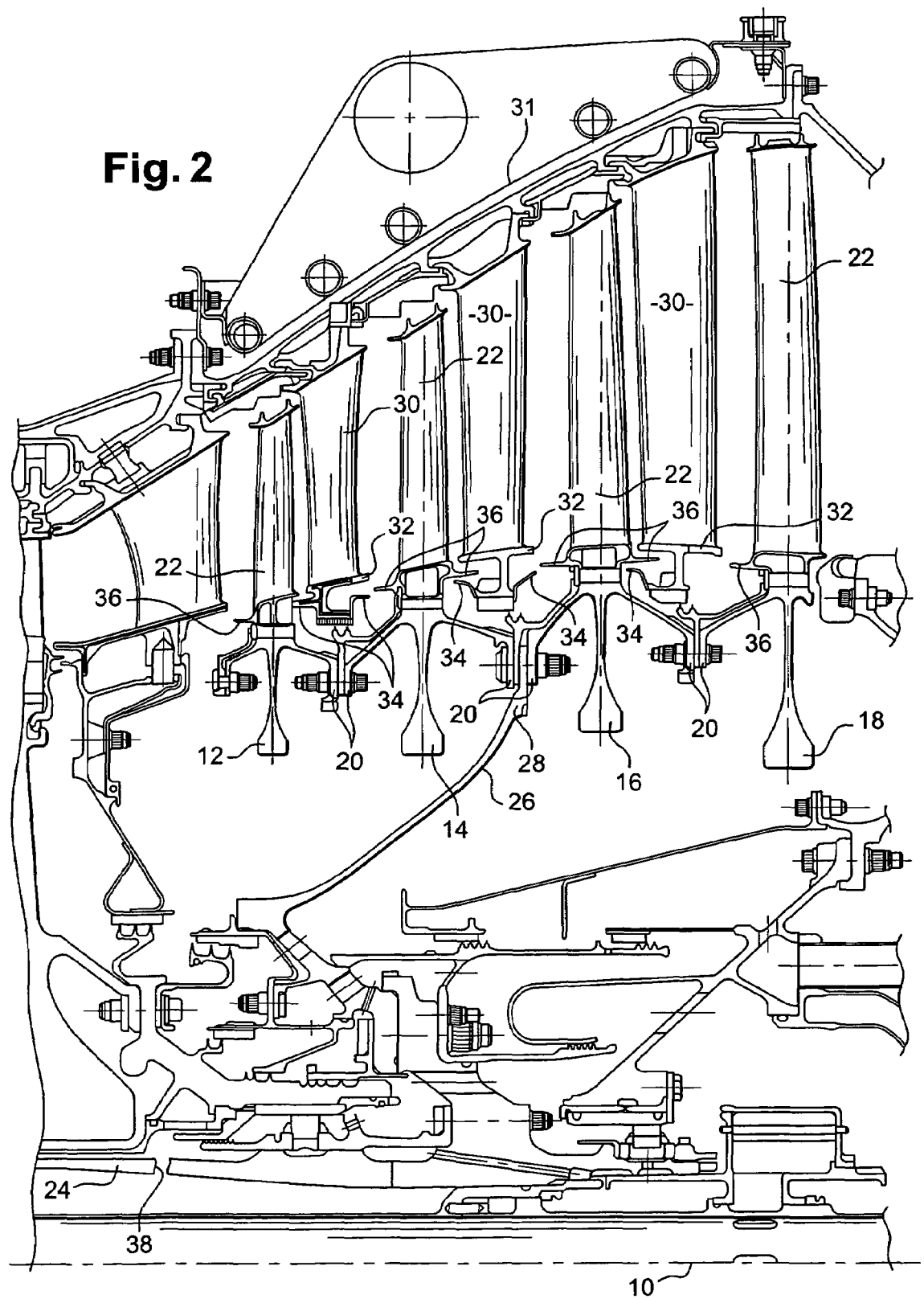
FIG. 2 is a partial diagrammatic view in axial cross-section of the turbine shown in FIG. 1 in which the shaft of the turbine is broken.

The device for limiting overspeed of the low-pressure turbine according to the invention is carried or formed by the upstream rim 34 of the first stage or upstream stage of fixed blades 30 and upon which a part of the roots of the blades 22 of the upstream disk 12 is intended to come to bear at the start of the downstream displacement of the rotor resulting from the fracture at 38 of the turbine shaft 24 and from the pressure exerted by the combustion gases on the blades 22 of the disks 12, 14, 16, 18 of the rotor (FIG. 2).

The axial clearance 40 (FIG. 1) between the upstream rim 34 of the first stage of fixed blades 30 and said part of the roots of the blades 22 of the first disk 12 is less than the axial clearances between the other disks 14, 16, 18 of the rotor and the other stages of fixed blades 30 such that the contact or interference between the rotor and the stator takes place firstly between this rim 34 and said part of the blade roots 22 during the downstream displacement of the rotor of the turbine when the shaft 24 fractures.

As better seen in FIGS. 3 and 4, the parts of the blades comprised between the blade plates and the blade roots comprise radial ribs or struts 42 on the downstream side, which are typically a few millimetres thick and are in the radial direction at the level of the upstream circumferential rim 34 of the first stage of fixed blades. This rim 34 forms means of shearing the struts 42 of the moving blades 22 of the first stage, in the case of fracture of the shaft 24, and it can be reinforced for this purpose if necessary. Its axial length, protruding in the upstream direction, must make it possible to cut a sufficient portion of the struts 42 for the stress in the remaining part of the struts 42 to be at least equal to or greater than the ultimate breaking strength of the material of the blades 22, in order to ensure the fracture of these blades.

The rim 34, obtained by casting, can be oversized in thickness in order to have sufficient strength and it can be machined in order to improve its power to cut the struts 42. In particular, it is possible to deposit on this rim 34 a coating of a hard and/or abrasive material (having a hardness equal to or greater than that of the material of the moving blades 22) and it can be shaped into sawteeth, by casting or by machining, as shown in FIG. 5.

In this figure, the stage of fixed blades 30 comprises a circumferential juxtaposition of several annular sectors 32 whose upstream rims 34 are formed with a plurality of sawteeth 44 whose shape and orientation are determined by the direction of rotation 46 of the moving blades 22 with respect to the fixed blades 30. In the example shown, the sawteeth 44 each comprise an edge 48 substantially parallel with the axis 10 of the turbine, attached to a cutting edge 50 which extends in the circumferential direction and which is connected to the base of the following tooth by an oblique edge 52.

Figure 6:
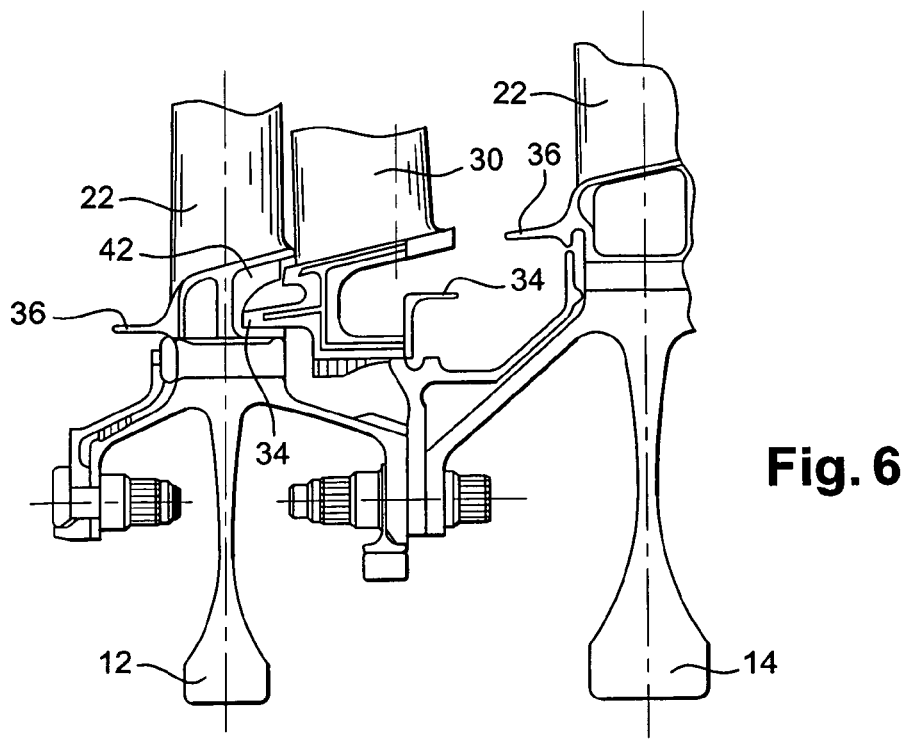
FIG. 6 is a diagrammatic view in axial cross-section of the device according to the invention, illustrating the start of the shearing of the moving blades of the upstream disk.
Figure 7:
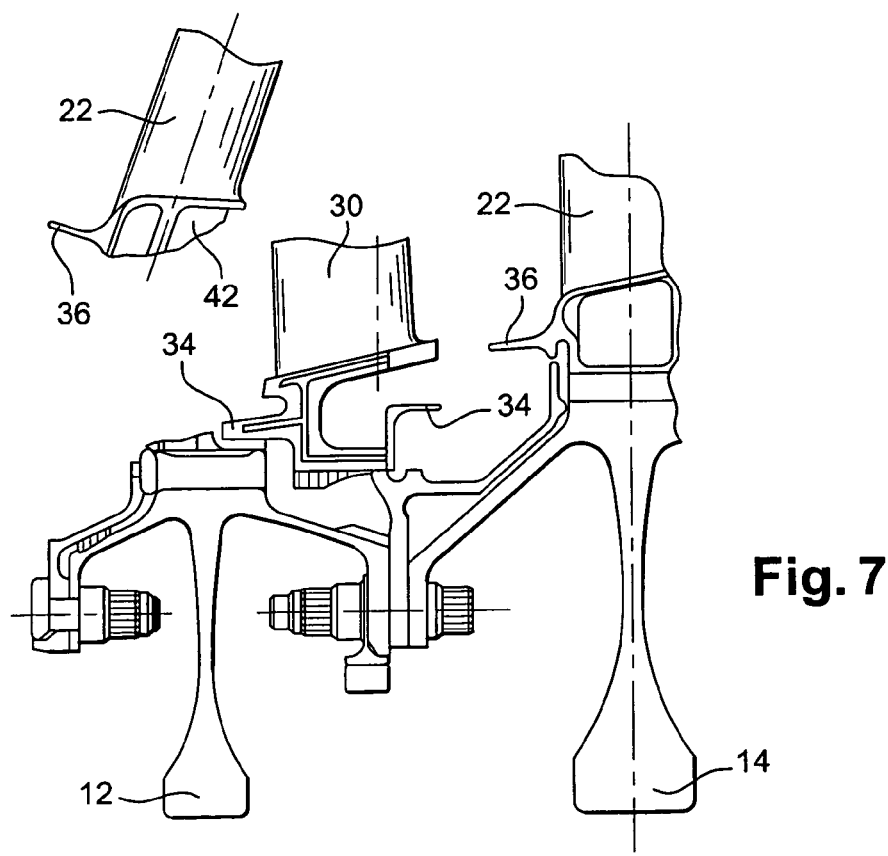
FIG. 7 is a view corresponding to FIG. 6, illustrating the destruction of the moving blades of the upstream disk.

The device according to the invention functions as follows: the struts 42 of the blades 22 of the upstream disk 12 come into abutment against the upstream rim 34 of the first stage of fixed blades 30 from the start of the displacement in the downstream direction of the rotor of the turbine following the fracture of the, turbine shaft 24. As the rotor continues to rotate about the axis 10, the shearing means provided on or formed by the rim 34 cut out a part of the struts 42, as shown in FIG. 6. The blades 22 are then made sufficiently fragile to break (FIG. 7) under the effect of the pressure of the combustion gases and of the centrifugal force. The pieces of the blades 22 of the upstream disk 12 are projected onto the fixed blades 30 of the stator and destroy them as well as the fixed and moving blades of the other stages of the turbine.

The destruction of the rotor of the turbine is carried out very quickly, typically within a period of time of whose order of magnitude is one tenth of a second after the fracture of the shaft. This destruction eliminates any risk of overspeed of the turbine and therefore of explosion of the turbine and perforation of the casing of the turbine and of the fuselage of the aircraft.

The invention claimed is:

1. A device for limiting overspeed of a turbine in a turbomachine, the turbine comprising:

a rotor formed from disks mounted on a turbine shaft and carrying moving blades, stages of fixed vanes disposed between the disks of the rotor, and means of destruction of the blades of the disks of the rotor in case of a fracture of the turbine shaft, wherein the means of destruction are fixed and carried by a stage of fixed vanes situated between an upstream disk of the rotor and a following disk of the rotor and are provided at a radially inner end of the fixed vanes in order to shear the blades of the upstream disk of the rotor at the start of a downstream displacement of the rotor resulting from the fracture of the turbine shaft.

2. The device according to claim 1, wherein the means of destruction are carried or formed by an upstream circumferential rim of the stage of fixed blades vanes.

3. The device according to claim 2, wherein the means of destruction comprise a plurality of sawteeth distributed around the circumference of said rim.

4. The device according to claim 1, wherein the means of destruction are intended to act on thin parts or "struts" of the moving blades, adjacent to the blade roots.

5. The device according to claim 4, wherein the means of destruction have an axial dimension protruding in the upstream direction equal to at least a fraction of the axial dimension of the thin parts of the moving blades to be sheared and sufficient for the uncut or non-destroyed part of the moving blades to be subjected to a stress at least equal to its ultimate breaking strength.

6. The device according to claim 1, wherein the means of destruction are made from a material of hardness greater than that of the moving blades to be destroyed.

7. The device according to claim 1, wherein the means of destruction are covered at least partially with an abrasive material.

8. The device according to claim 1, wherein the means of destruction are produced by machining or by casting.

9. The device according to claim 1, wherein the turbine is a low pressure turbine of a turbojet.

10. A device for limiting overspeed of a turbine in a turbomachine, the turbine comprising:
a rotor formed from disks mounted on a turbine shaft and carrying moving blades, stages of fixed blades disposed between the disks of the rotor, and
means of destruction of the moving blades of the disks of the rotor in case of a fracture of the turbine shaft,
wherein the means of destruction are fixed and carried by a stage of fixed blades situated between an upstream disk of the rotor and a following disk of the rotor and are intended to shear the blades of the upstream disk of the rotor at a start of a downstream displacement of the rotor resulting from the fracture of the turbine shaft, and
wherein the means of destruction are intended to act on thin parts of the moving blades, adjacent to the blade roots.

11. The device according to claim 10, wherein the means of destruction include an axial dimension that protrudes in an upstream direction equal to at least a fraction of an axial dimension of the thin parts of the moving blades to be sheared and sufficient for an uncut or non-destroyed part of the moving blades to be subjected to a stress at least equal to an ultimate breaking strength of the moving blades.

12. A device configured to limit overspeed of a turbine in a turbomachine, the turbine comprising:
a rotor that includes a plurality of disks mounted on a turbine shaft, each of the plurality of disks including a plurality of blades circumferentially mounted thereon such that the plurality of blades are configured to rotate with the rotor;
stages of fixed vanes alternately disposed with respect to the plurality of disks such that each stage of fixed vanes is disposed between an upstream one of the plurality of disks and a downstream one of the plurality of disks;
a blade destruction mechanism that is configured to destroy the blades of the disks of the rotor in case of a fracture of the turbine shaft, the blade destruction mechanism being fixedly mounted on a radially inner end of one of the stages of fixed vanes such that the blade destruction mechanism is configured to shear the blades of the upstream one of the plurality of disks when a downstream displacement of the rotor occurs due to the fracture of the turbine shaft.

13. The device according to claim 12, wherein the blade destruction mechanism is included on an upstream circumferential rim of the one of the stages of fixed vanes.

14. The device according to claim 13, wherein the blade destruction mechanism includes a plurality of sawteeth distributed around the circumference of said rim.

15. The device according to claim 12, wherein the blade destruction mechanism is configured to act on thin parts of the blades of the upstream one of the plurality of disks that are adjacent to the blade roots.

16. The device according to claim 15, wherein the blade destruction mechanism includes an axial component that protrudes in an upstream direction by an amount that is at least equal to a fraction of an axial dimension of the thin parts of the blades of the upstream one of the plurality of disks such that, when the fracture of the turbine shaft occurs, an uncut or non-destroyed part of the blades of the upstream one of the plurality of disks is subjected to a stress at least equal to an ultimate breaking strength of the blade.

17. The device according to claim 12,
wherein the blade destruction mechanism includes a first material having a first hardness, and the blades of the upstream one of the plurality of disks include a second material having a second hardness, and
wherein the first hardness is harder than the second hardness.

18. The device according to claim 12, wherein the blade destruction mechanism is covered at least partially with an abrasive material.

19. The device according to claim 12, wherein the turbine is a low pressure turbine of a turbojet.

20. The device according to claim 12, wherein the one of the stages of fixed vanes that includes the blade destruction mechanism is arranged further upstream than any other stage of fixed vanes of the stages of fixed vanes.

* * * * *

UNITED STATES PATENT AND TRADEMARK OFFICE
CERTIFICATE OF CORRECTION

PATENT NO.         : 7,484,924 B2  
APPLICATION NO. : 11/227137  
DATED                  : February 3, 2009  
INVENTOR(S)       : Jean-Luc Soupizon Page 1 of 1

It is certified that error appears in the above-identified patent and that said Letters Patent is hereby corrected as shown below:

Claim 2, column 4, line 67, delete "blades" after the word "fixed".

Signed and Sealed this

Sixteenth Day of June, 2009

JOHN DOLL  
*Acting Director of the United States Patent and Trademark Office*